Figure 1:
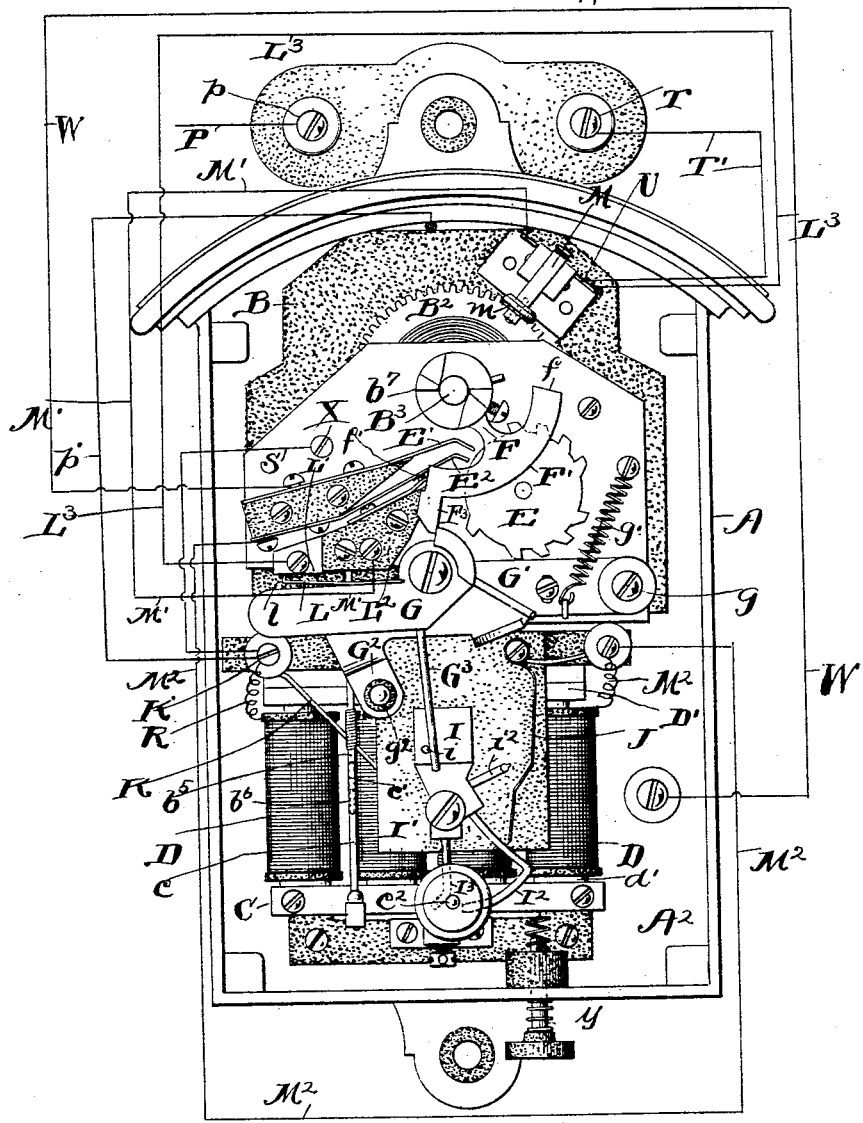

(No Model.) 6 Sheets—Sheet 1.

A. T. WHITTLESEY & F. B. DODGE.
ELECTRIC SIGNAL BOX.

No. 587,565. Patented Aug. 3, 1897.

Witnesses.
E. B. Gilchrist
Ella E. Tilden

Inventors,
Albert T. Whittlesey
and
Frederick B. Dodge
By
Lynch, Dour & Donnelly
Their Attorneys.

(No Model.) 6 Sheets—Sheet 2.

A. T. WHITTLESEY & F. B. DODGE.
ELECTRIC SIGNAL BOX.

No. 587,565. Patented Aug. 3, 1897.

Witnesses.
E. B. Gilchrist
Ella E. Tilden

Inventors.
Albert T. Whittlesey
and
Frederick B. Dodge
By Lynch, Dorr & Donnelly,
Their Attorneys.

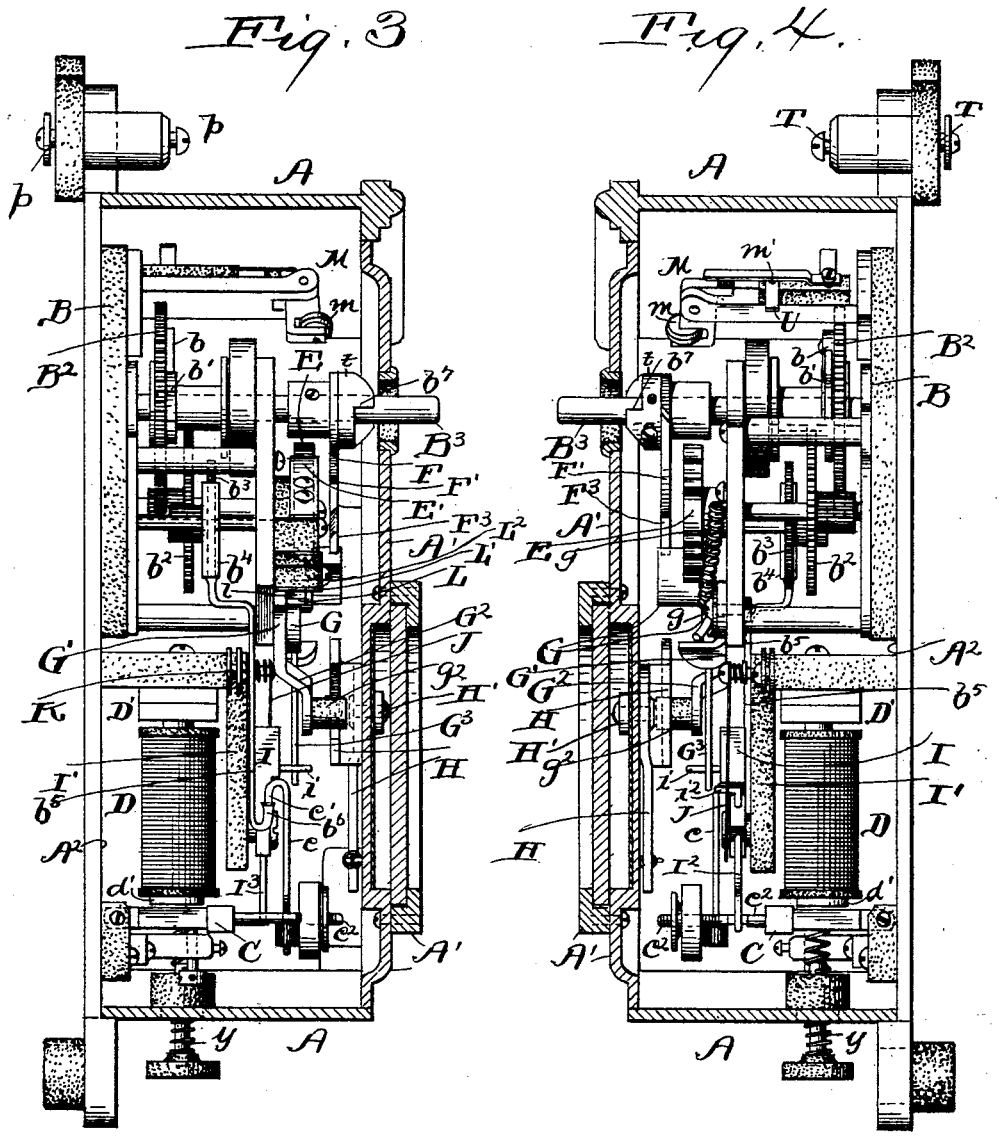

(No Model.) 6 Sheets—Sheet 4.
A. T. WHITTLESEY & F. B. DODGE.
ELECTRIC SIGNAL BOX.
No. 587,565. Patented Aug. 3, 1897.
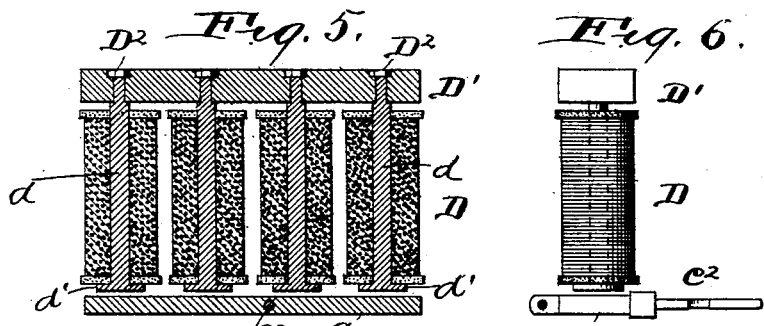
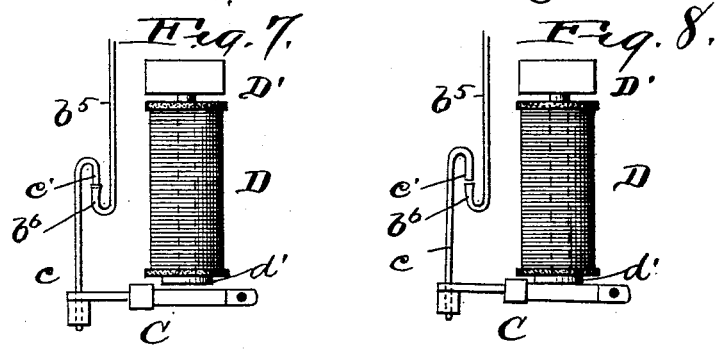
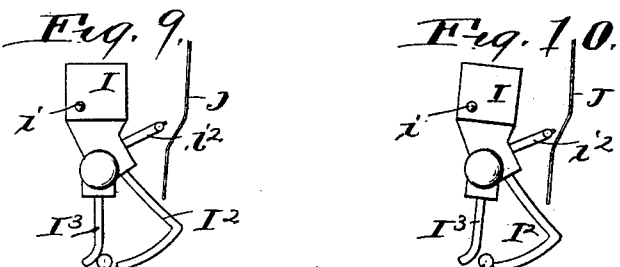
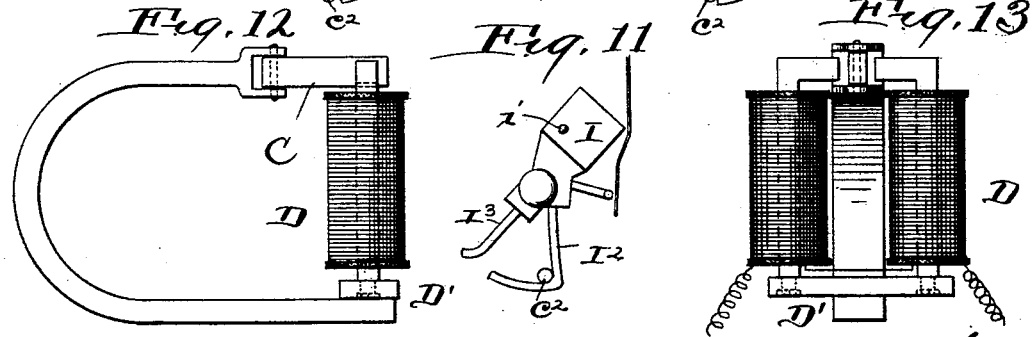
Witnesses
E. B. Gilchrist
Ella E. Tilden
Inventors
Albert T. Whittlesey
and
Frederick B. Dodge
By
Lynch, Dorer & Donnelly
Their Attorneys (No Model.) 6 Sheets—Sheet 5.
A. T. WHITTLESEY & F. B. DODGE.
ELECTRIC SIGNAL BOX.
No. 587,565. Patented Aug. 3, 1897.
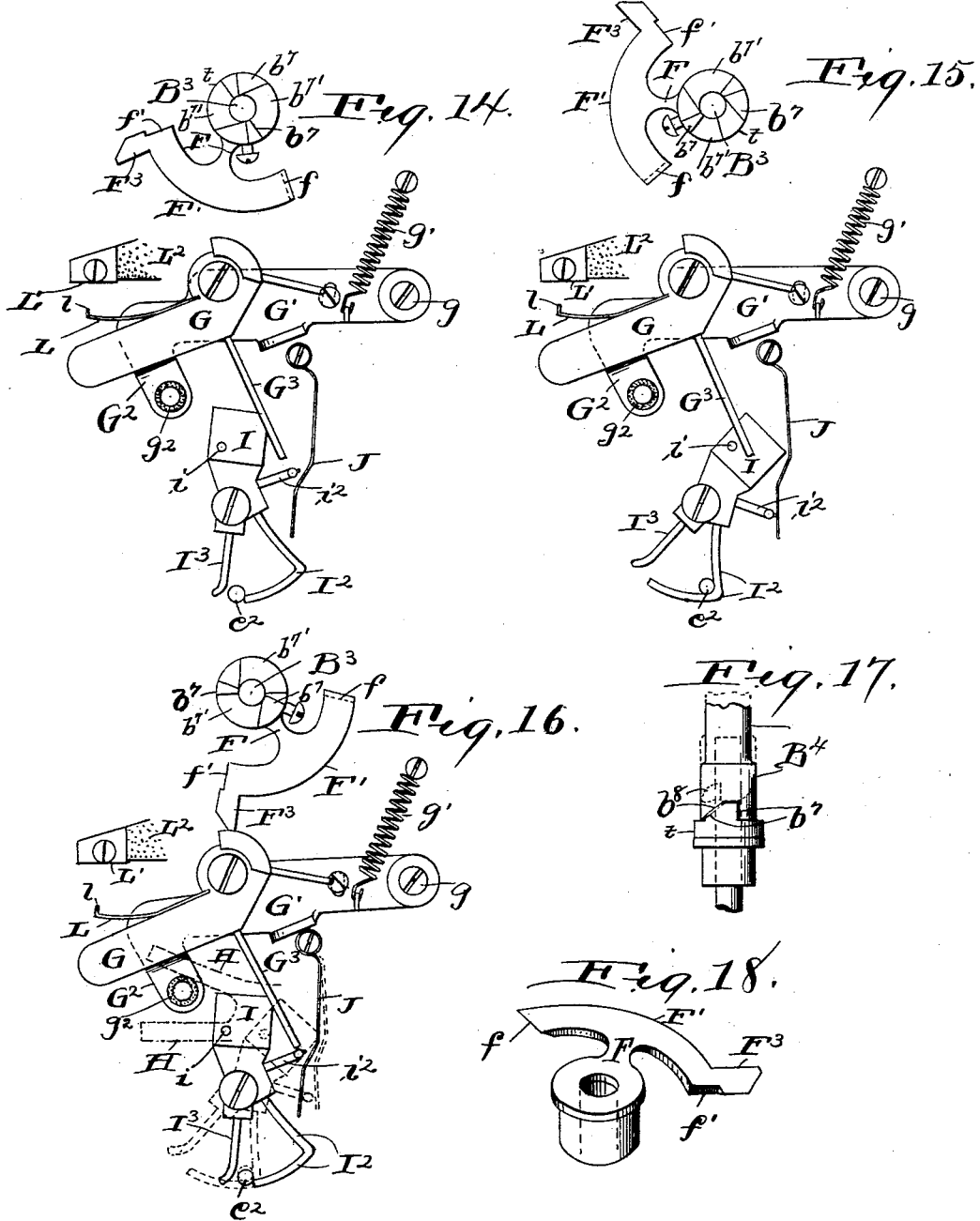

(No Model.) 6 Sheets—Sheet 6.
A. T. WHITTLESEY & F. B. DODGE.
ELECTRIC SIGNAL BOX.

No. 587,565. Patented Aug. 3, 1897.

UNITED STATES PATENT OFFICE.

ALBERT T. WHITTLESEY AND FREDERICK B. DODGE, OF CLEVELAND, OHIO.

ELECTRIC SIGNAL-BOX.

SPECIFICATION forming part of Letters Patent No. 587,565, dated August 3, 1897.

Application filed June 18, 1896. Serial No. 596,011. (No model.)

*To all whom it may concern:*

Be it known that we, ALBERT T. WHITTLESEY and FREDERICK B. DODGE, of Cleveland, Cuyahoga county, Ohio, have invented certain new and useful Improvements in Electrical Signal-Boxes; and we do hereby declare the following to be a full, clear, and exact description of the invention, such as will enable others skilled in the art to which it pertains to make and use the same.

Our invention relates to electrical signal-boxes such as are used to transmit signals from outlying stations to a central office.

Our invention consists in so constructing the said boxes and arranging the mechanism therein contained that the signal as it comes in from any one of the boxes shall not be interfered with by a signal coming in from another box on the same circuit.

In a box or device constructed according to our invention it is impossible for any two boxes on the same circuit to interfere with the other in transmitting signals.

In the drawings and specification, respectively, we show and describe a construction especially designed to accomplish the results above stated; but we do not limit our invention to the construction shown or described, inasmuch as it is apparent to any person skilled in this art that the mechanical details may be varied without departing from our invention.

In the drawings we have shown the insulating material used in the construction in "stipple," so as to clearly distinguish it from the metallic, magnetic, or electric conducting material.

Figure 2:
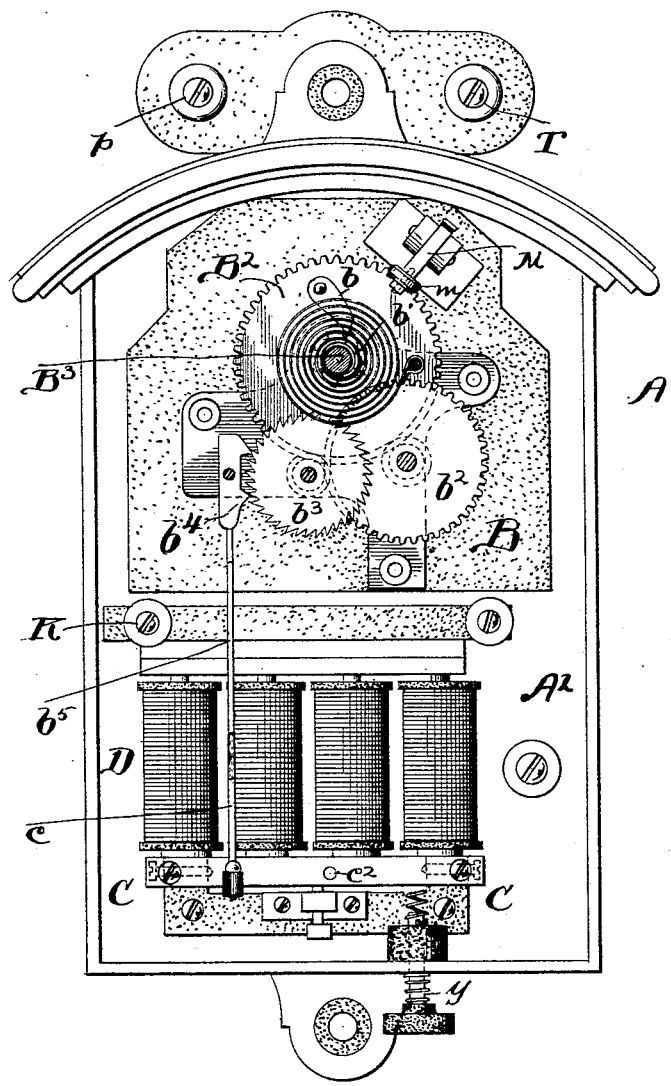
Figure 19:
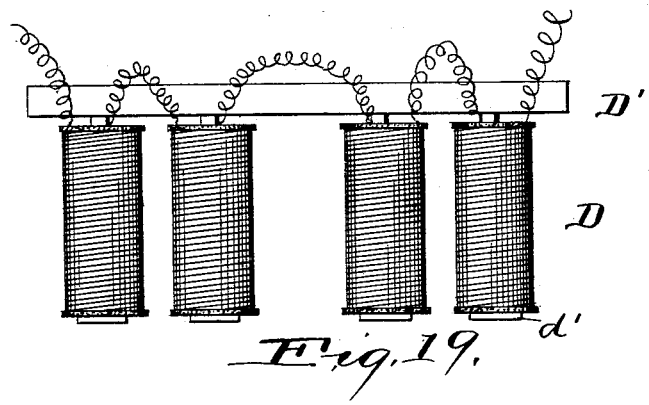
Figure 20:
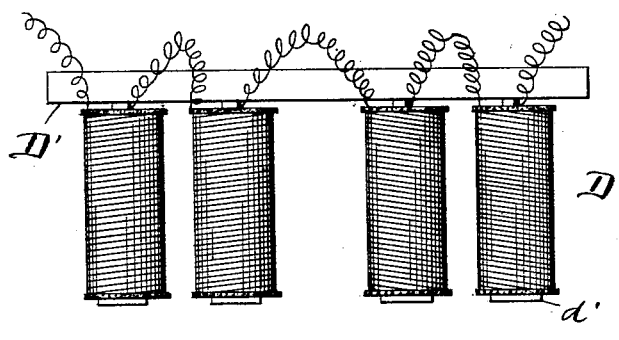

Figure 1 of the drawings illustrates in front elevation an electrical signal-box embodying our invention. Fig. 2 is a like view to Fig. 1, but with upper front plate detached, and showing more clearly the clockwork mechanism and its connection with a "trip" device. Figs. 3 and 4 are views in side elevation, showing a box mechanism from either side with the casing in section. Fig. 5 illustrates an electromagnet having two spools on either end and connected, as shown, to a yoke. Fig. 6 is a view in side elevation, illustrating the construction of armature in connection with the electromagnets. Fig. 7 illustrates in side elevation the connection of the armature with the escapement pendant or arm, showing the engagement of the parts. Fig. 8 is same view illustrating the movement-locking device free to operate. Figs. 9, 10, and 11 illustrate the different positions of the locking-lever under certain conditions of the current and armature. Figs. 12 and 13 illustrate a modification of electromagnet in connection with a horseshoe permanent magnet to which they are secured. Figs. 14, 15, and 16 illustrate the positions of the switching and releasing devices under conditions hereinafter set forth. Fig. 17 illustrates in detail one construction of key in connection with the winding-post, whereby the key is adapted to turn in one direction only. Fig. 18 is a detailed view of the cam and stop device, which is secured to the spring-spindle. Figs. 19 and 20 are views of modifications of electromagnets adapted to our device.

A represents a casing or container to which the mechanism is secured and in which it is contained, so as to prevent its being interfered with by unauthorized persons. This casing or container is provided with the usual door $A'$, having suitable openings and devices for setting or starting the mechanism.

B represents a slab of hard rubber or other insulating material, which is secured to the rear wall $A^2$ of the casing A, and to which is secured in turn the "clockwork" or "movement" of the device. The clockwork or movement of the device may consist, as shown in Fig. 2, of a mainspring-gear $B^2$, provided with the usual shaft or spindle $B^3$ and pawl and ratchet $b$ $b'$, respectively. One or more intervening gears and pinions $b^2$ are preferably provided for communicating rotary motion to the escapement-wheel $b^3$, the said escapement-wheel $b^3$ acting through the escapement $b^4$ to control the speed and action of the movement, as is usual in clock-movements.

The escapement $b^4$ is provided with a downwardly-extending arm $b^5$, having at its lower or free end an upturned portion $b^6$, (shown more clearly in Figs. 3, 7, and 8,) which is opposed to and adapted to engage a downwardly-extending portion $c'$ on the free end of an arm $c$, which arm is adjustably attached to an armature C and extends upwardly therefrom. The engagement or disengagement of the parts $b^6$ and $c'$ is what prevents or allows of the box or movement working after the box is "set," inasmuch as the engagement of parts $b^6$ and $c'$ does not allow the free end of the arm $b^5$ to vibrate, and hence checks the movement of the escapement-wheel $b^3$, or, on the other hand, the disengagement of the parts $b^6$ and $c'$ allows the said arm $b^5$ to vibrate, and thus the escapement-wheel $b^3$ will revolve and allow the movement to work.

D represents a set of electromagnets with connecting-yoke D'. The magnets and yoke are of special arrangement and construction, by means of which the armature C acts in connection with the arm $c$ to either engage or disengage the parts $b^6$ and $c'$, depending upon whether the main line is in use or not, or, in other words, depending upon whether any other box on the same circuit is transmitting a signal, and it is this arrangement or construction, when taken in connection with a "pole-changer" at the receiving-station, that constitutes the main feature of our improvement and invention.

It is of course understood that details other than those above set forth are necessary in order to constitute an operative signal-box, and such have been provided and will be set forth hereinafter; but before proceeding to describe them we will, for the sake of clearness, now explain the construction and operation of the electromagnets in connection with the movement thus far described and in connection with the main line and receiving-station and with the other boxes on the same circuit without taking into consideration the local circuits of the box.

In Figs. 5, 6, 7, 8, 19, and 20, D' represents a yoke which is directly connected to the cores $D^2$ of the electromagnet D. This yoke D' is a permanent magnet, and the electromagnets D are so arranged on the yoke as to occupy the positive and negative ends in equal numbers—for instance, one on either end, two on either end, or three on either end, as found necessary or convenient—and the cores $D^2$ of the said electromagnet are magnetized with a polarity according to the direction of the current passing through them, and hence it will follow and be understood that the direction of the lines of force, and consequently the polarity of the electromagnets, will be reversed when the direction of the current is reversed. Now, inasmuch as the cores of the electromagnets are directly secured to the permanent magnet D', as described, it follows that if the magnetic polarity of the electromagnets induced by the current is the same as the magnetic polarity of the permanent magnet or yoke D' the two magnetic forces act in conjunction with each other and exert a pull or attraction on the armature C, but if the direction of the current is reversed, and thus the polarity of the current is reversed, it follows that the polarity or magnetism of the magnets is opposite to the magnetism of the permanent magnet or yoke D', which causes the two unlike polarities or magnetic forces to combine with each other (establishing a latent force within the magnet and yoke) in such a manner that the pull or attraction on the armature is zero or neutral, thus allowing the armature to remain or resume the normal position away from the cores of the electromagnets.

In constructing the electromagnets so as to arrive at the above-described results it is essential that the winding of said electromagnets and their arrangement in connection with the magnetic yoke be such that the normal current of the main wire will magnetize the cores of said electromagnets, so that the magnetic polarity will operate in conjunction with the magnetic yoke to attract the armature C, and thus free or disengage the part or end $c'$ from the part or end $b^6$, and hence the movement will be free to operate when manipulated or set, because the arm $b^5$ is free to vibrate and will allow the escapement and escapement-wheel to operate.

By the words "normal current of the wire" used in this specification is meant that current which is passing or flowing through the circuit when the boxes on the circuit are all at rest and no one of the boxes is in use, or when no signal is being received on that circuit.

We have shown in Figs. 5, 6, 7, and 8 our preferred method of construction and arrangement of electromagnets whereby the functions as above set forth are accomplished, which is as follows:

$D^2$ $D^2$ represent cores of soft iron, which are preferably formed with reduced body portions $d$, said body portions being provided with heads $d'$ $d'$ and wound with wire, as is usual in electromagnets. The object in reducing the body portion of the core is twofold—first, to economize space, and, secondly, to economize wire, and hence resistance in the electromagnets. The free ends of the cores or that end which comes in contact with the armature is made of any desired diameter that will give the results required.

It will be understood that the magnetic strength of a core is in proportion (within limit of the saturation of the core) to the cross-section of the end of the core near or contiguous to the armature and to the convolutions of wire on the core, and hence by reducing the diameter of the core-body room is economized, inasmuch as a greater number of convolutions of wire is had with a given length and gage of wire, and stronger electromagnets are the result without increasing the resistance in the circuit through the magnets. This element is an important factor in the machine or device on account of the limited space in the casing A in connection with a limited amount of electromotive force used to energize the line.

Taking the limit of the resistance of the line and the resistance of the mechanism of any one box on the circuit in connection with the resistance of the office-relay at the central station and estimate it at four hundred ohms total resistance to be overcome by the battery force, it will be seen that at least sufficient electromotive force must be applied to overcome this resistance of four hundred ohms, and as a safeguard any reasonable amount of electromotive force may be added, say to one thousand ohms, to "work the line;" but this one thousand ohms of electromotive force is not sufficient to pass through the whole number of boxes on the line including their electromagnets, so that each and all of the electromagnets will be energized to attract the several armatures of the boxes or any one of said armatures, and hence it becomes necessary to "cut out" each and every one of the boxes when the boxes are at rest, leaving the only resistance that of the main line and office-relay.

When a box is set or manipulated, it is switched into the circuit, as is also the electromagnets of that box, and if the main line is "free" and no other box is sending a signal the electromagnets, in conjunction with the permanent-magnet yoke, will operate to attract the armature C and free the parts $b^6$ and $c'$ and the box starts to send in its signal, and at that instant a "circuit-pole changer" is operated in any suitable manner at the receiving-station and the direction of the current is changed and stays changed until the box has transmitted its signals, after which the pole-changer returns to its first position. Now without the interference of some outside device or means the result of changing the direction of the current would be to free the armature C, as hereinbefore explained, and the mechanism of the box would stop on account of the engagement of parts $b^6$ and $c'$, but we have provided a means for holding the armature to the magnets while the box is in operation, and shall now proceed to describe its operation and also the operation of the other mechanical details which automatically switch the box in or out of the main-line circuit and also switch out the electromagnets after the box has been started to send its signals.

Hereinbefore we have described the clockwork mechanism and its operation in connection with the electromagnets whereby it is free to work under certain conditions and held fast under other conditions of the current.

Secured to or integral with the spindle $B^3$ of the mainspring-gear $B^2$ is an enlarged portion $t$, provided with two peculiarly-shaped upwardly-projecting teeth $b^7$ and two flat surface portions $b^{7'}$, so constructed, as shown in Fig. 17, as to allow of the spindle $B^3$ being turned to wind the spring, but if the key or crank used is turned in an opposite direction the face of the key will "ride" over said teeth $b^7$ and the works cannot be forced. This is an important feature, inasmuch as watchmen or others when in a hurry are apt to force the works of the box, and hence the mechanism may be disarranged and become inoperative as a signal-box.

$B^4$ represents the key with which the spring is wound through spindle $B^3$ and the enlarged portion $t$ of said spindle. This key $B^4$ is provided with a peculiarly-shaped face $b^8$, which is adapted to fit flush with the upper face of the said enlarged portion $t$ of the spindle $B^3$ and to engage the teeth $b^7$ when the key is turned in the direction to wind the spring, and the key will ride over the teeth $b^7$ when turned in the opposite direction.

On the shaft of pinion $b^2$ is secured the usual character-wheel E with suitable circuit make-and-break springs E' E² operating in connection therewith, and it is through this wheel E and springs E' or E² that the signal is automatically made or transmitted through the main line to the central or receiving station or office.

In order to control the wheel E in its movement so that it will stop in a predetermined position, we have provided the following mechanism: F represents an arm secured to the spring-spindle $B^3$ so as to move with it as said spindle revolves during the operation of the box. This arm F has secured at its outer end a segmental stop and cam F', beveled at one end $f$ and having a square face $f'$ at the opposite end. At the end $f'$ is provided a short arm $F^3$ for engaging the short arm of a pivoted bell-crank lever G, which we call the "controlling-lever" and which is pivoted to an intermediate lever G'. The lever G' is pivoted at $g$ to the face of the works and is provided with a spring $g'$ for holding it up or in normal position, such as it assumes when the box is not manipulated for special alarm-service. At the free end of the lever G' is a downwardly-extending arm $G^2$, provided with a roller $g^2$, of insulating material, which engages in a bifurcated end of a lever H, pivoted to the box lid or door A', the said lever H being provided with means, such as a handle H', for manipulating it. The handle H' or other means for manipulating the lever H is usually inclosed in a recess formed in the box-door and the recess is covered with glass, which is to be broken in case of necessity, so as to manipulate said lever H, as will be hereinafter set forth.

The controlling-lever G has an arm $G^3$ extending downward, which engages a pin $i$ on a locking device I. This lock I consists of a weighted lever pivoted at its lower end to an insulating-block I', and it is in such position that the center of gravity of the lever, with wires or arms attached, causes the lever I when released to fall or incline, as shown in Fig. 10 or Fig. 11. Arms $I^2$ $I^3$ extend downwardly from the lower end of lever I, the arm $I^2$ being so placed and formed that when the lever is free it will rest against the pin $c^2$, which is secured to armature C, as shown in Fig. 10, or pass under said pin $c^2$, as shown in Fig. 11, according to the location of the armature, away from the magnets or against them. Thus it will be seen that when the locking-lever I is released it will assume the position shown in Fig. 10 if the armature is away from the electromagnets, and just as soon as the armature is lifted or attracted the arm $I^2$ passes under the pin $c^2$ and locks the armature against the magnet-cores and in its raised position, thus holding the parts $b^5$ and $c'$ out of engagement regardless of the direction of the current, and hence when the "current-pole changer" reverses the direction of the current upon the starting of the signal the box will continue to send in its signal until it comes to rest or stops regardless as to whether or not the electromagnets are in circuit.

J represents a wire or spring which is included in the main circuit after the locking device has assumed the position shown in Fig. 11, but not until then, and this wire or spring J acts to cut out the electromagnets from the circuit, the object being to lessen the resistance of the line by cutting out said magnets while the box is in operation transmitting the signals. Therefore every time the locking device has assumed the position shown in Fig. 11 the armature C is locked to the magnet-cores and the electromagnets are cut out of circuit. An arm $i^2$ is secured to the locking device I in such position as to engage the spring or wire J and establish an electric circuit through the said arm $i^2$ and thence through lever I and by way of its pivot, and the wire K to a "post" $K'$, from whence it passes, as will be hereinafter explained.

L represents a spring secured at one end to the controlling-lever G, near its pivoted part, and free at its other end. At the free end of spring L it is provided with an upturned portion $l$, which establishes electrical contact with a metallic piece $L'$, secured to insulating piece or block $L^2$. The metallic piece $L'$ has electrical connection with wire $L^3$, which in turn is in direct electrical contact with one wire of the line or circuit. The other wire of the line or circuit is in direct electrical contact with the face-plate of the works at X, and hence by following the circuit it will be seen that when the lever is in the position shown in Fig. 1 of the drawings the current of the main line will be short-circuited through these parts and wires, and the mechanism of the box is cut out of the circuit while these parts remain in this normal position. In order to insure the armature being returned to its position away from the magnets and thus positively stop the box at the right time and also avoid any so-called "sticking" of the armature, we have provided the arm $I^3$, which engages the pin $c^2$ on the armature C when the locking-lever I is returned to its normal position, and forces the said armature away from the magnets and locks it in this position until the box is again set or manipulated.

M represents a circuit-breaker, which consists of a small pivoted bell-crank lever having a roller $m$ on one of its arms and contact-point $m'$ on the other arm. The circuit-breaker acts, in conjunction with the segmental stop or cam $F'$, to break the circuit by engaging the roller $m$ at a predetermined time during the transmission of a signal, and thus acts, in conjunction with the character-wheel, to indicate a special signal during the complete transmission of said signal.

In the drawings, Figs. 12, 13, 19, and 20, we have shown several arrangements of electromagnets and modes of winding the same which, in connection with the magnetic yoke, will accomplish the result of attracting the armature C when the normal current of the main wire is passing and of allowing the said armature to resume its normal position when the current is reversed or its direction changed.

In Fig. 19 all the spools are wound in the same direction, and the spools on either end of the yoke have their wires connected in series, both sets of spools to be connected in the manner shown.

In Fig. 20 the spools on one end of the yoke are wound in one direction and those on the opposite end are wound in the opposite direction and the wires of all the spools are connected in series.

In Figs. 12 and 13 we have shown a construction of combined permanent magnets and electromagnet which will accomplish the results of releasing the parts $b^6$ and $c'$ in the same manner and by the same action as it is accomplished in the electromagnets with permanent magnetic yoke hereinbefore set forth. In these figures is shown a U-shaped permanent magnet, onto one end or pole of which is secured an electromagnet with yoke. We will say that this electromagnet is placed and secured on the positive end of the permanent magnet, and thus both cores have a positive polarity imparted to them, or, in other words, the same polarity as the end of the permanent magnet to which they are secured. The spools are so wound that when a current is passing through them the core of one has imparted to it a positive polarity and that of the other spool a negative polarity, and thus it will be seen that the positive spool has the added magnetism and attraction of the permanent magnet and its own imparted magnetism, and the attraction of the other spool is neutralized by the positive polarity of the permanent magnet and has no action. Thus the armature C, which is pivoted or hinged to the foreshortened negative end of the permanent magnet, is attracted at its free end to the spool having the magnetism, and the reversing of the current reverses the action of the armature C. The armature C will operate the trip-wire $c$, which may be secured to armature C, as shown in Figs. 7 and 8, or in any other suitable manner, so as to operate to release or engage the ends $c'$ and $b^6$ and start or release the operative mechanism of the box. The results obtained when complying with any of the above constructions or arrangements are as follows: When the current passes through the electromagnets, the cores of the spools on one end of the magnetic yoke are magnetized with one polarity and those on the other end of the yoke with the opposite polarity, and when the current is reversed the polarity of the electromagnet-cores is also reversed.

We have shown several constructions of electromagnets differing in detail, but all acting on the same principle, and have hereinbefore set forth the mechanical details as we consider them best adapted in the construction and operation to perform their several functions in connection with the other parts of the device, but we do not intend to be understood as limiting our invention to these details and set them forth or describe them only for the purpose of showing a modification, which can be used to perform the aforesaid function.

The operation of our improved box when constructed as hereinbefore described is as follows: When a person desires to send in an ordinary signal by the use of the key B$^4$, the said key is made to engage the spindle B$^3$ and clutch $b^7$, and the key is turned in the direction to wind the box-spring, (which is in the box shown and described from left to right at the top). This action, as is shown in Figs. 14 and 15, operates to revolve the spindle and also to move the arm F and its attached segment-stop F' in the same direction, and its short arm F$^3$ moves away from the short arm of lever G and releases it, so that it drops to the position shown in Figs. 14 and 15, and in turn through arm G$^3$ the weighted locking device I is released and assumes the position shown in Figs. 14 and 15, also illustrated in Figs. 10 and 11, depending upon whether or not the armature C is attracted to the electromagnets, which in turn depends upon the direction of the current passing through the line and magnets. If the current is the normal current of the line, then the armature C is attracted to the electromagnets and is locked in this position, as shown in Figs. 11 and 15, and the signal starts in, and in so doing automatically operates a current-pole changer, and the signal is transmitted through this changed current until completed. As the signal is being transmitted the segmental stop F' is returning to its normal position, (shown in Fig. 1,) and as it does so its arm F$^3$ again engages the short arm of lever G and returns it to the position shown in Fig. 1, the lever G acting meanwhile to return the locking device I to its position, as shown in Fig. 1, thus unlocking the armature C and forcing the said armature C away from the electromagnets through the arm I$^3$ and stopping the mechanism of the box through arms $c'$ and $b^6$.

When it is desired to send in the special signal, which is operated or manipulated through the handle H', the glass at the front of the box inclosing it is broken and the handle pulled down. This action pulls down the lever G' and releases the lever G from the arm F$^3$, as shown in Fig. 16, and thus if no other signal is "coming in" the box will start, inasmuch as the spring being wound and the arm F$^3$ being released from the short arm of the pivoted bell-crank lever G said arm is free to and will revolve and make a full revolution before stopping. In sending in the special signal as above described the segment F' makes a full revolution, and in doing so the segmental cam F' engages the roller $m$ on the bell-crank lever M and the circuit is broken at $m'$ during the passage of the segment, and a prolonged signal is the result, and it is this that indicates that the signal is special.

The local circuits of the box are as follows: The main wire P is connected to post $p$ at one side of the box, and from this post $p$ passes into the box by means of wire $p'$ and thence to post K'. At this post K' the line-wire has electrical contact with wire K, connected electrically with lever I and with wire R, which passes to the electromagnets; also with wire S, which is electrically secured to the face-plate of the clockwork. At the opposite side of the box and in electrical connection with post T is the other end of the main wire. From post T the wire T' enters the box and is electrically connected to short metallic plate U, and through contact-point $m'$ or circuit-breaker passes to wire M' and from thence to the lower circuit make and break springs E$^2$. A wire M$^2$ leads from spring E$^2$ to the opposite end of the electromagnet-wire and to wire or spring J, whereby the electromagnets are cut out, as hereinbefore set forth.

The especial features of a signal and fire-alarm box equipped with our non-interfering device, as described in the foregoing specification, are as follows: When a person desiring to report or send in a call to a station or headquarters turns in a box and the line upon which his box is connected is free—i. e., not in use by any other person turning in signals—the particular box that he has set will start and continue to transmit its signals until completed. The starting of the box is guarantee to the person that the line is in order and that his signals are being exclusively transmitted to headquarters. Should the box fail to start, the person should wait (at least twenty seconds) until it starts. He then knows that his signals are being received. Otherwise during the time of waiting he knows that some one else is using the line or else the line is broken altogether. In case of the latter and he had waited twenty seconds (transmission of signals from any box requiring only from five to ten seconds) and the box still failed to start, he will then operate a mechanical release Y, that each box is provided with, which engages the armature C and returns the mechanism of the box to its normal position. Knowing that the line is out of order enables the person at once to take such other action as he may desire.

Signal-boxes equipped with the fire-alarm feature, or any fire-alarm boxes operated in the above-described manner, are valuable, inasmuch as persons turning in the alarm know at once whether that particular box is performing its work and further know that when the box starts its transmission of the alarm will not be interfered with by any other box on the line.

Another valuable feature is that any of the ordinary methods of "answer-backs" now in use, requiring a third return-wire or a separate signal-gong in each box, can be entirely dispensed with, thus simplifying the practical operation of a signal-circuit and thereby increasing its efficiency, because if the box starts the person sending the signal is sure that it is being received, and if the box does not start he is sure that his signal has not been received.

The strength or constancy of the permanently-magnetized yoke (if it should have the tendency to decrease) is rather maintained than otherwise, for the reason that the majority of the times the box is used the direction of the current is such that the electromagnetism of the spools is the same as the magnet they are attached to, thus preserving the same magnetic strength rather than weakening it.

If the electromagnet should accidentally receive an over-heavy current through it, the magnetized yoke would either be magnetized to saturation or its polarity reversed end for end, according to the direction of the heavy current. In the first case of saturation a short elapse of time will restore the magnet to its normal state. In the second case, with polarities reversed, simply reverse the two wires leading to the binding-posts of that particular box and the magnet and box are ready for use.

What we claim is—

1. In an electrical signal-box or signaling device of the character herein described, the combination with a series of electromagnets, of a magnetic yoke extending along the entire series of magnets and constituting a single permanent magnet, magnet-cores having an enlarged surface at one end, reduced body portions, and further-reduced end portions rigidly secured within said permanent magnet, and an armature provided with a trip or lock mechanism rigidly secured to said armature and actuated thereby, substantially as shown and described.

2. In an electric signal box or device, the combination with a series of spools of suitable magnet-wire, the cores of said spools having a reduced body portion, and said cores being secured at their further-reduced end portions rigidly to and within a permanent magnet, the other end of each core being greater in cross-section than the body portion thereof, of an armature having rigidly secured thereto means to permit the locking and freeing of the same, and a trip or lock device detachably secured to the armature and actuated thereby, substantially as described.

3. An electric signal box or device, comprising an electromagnet having that end of its core which is contiguous to the armature of greater cross-section than the body portion, and the other end portion of its core being of less diameter than the said body portion, a permanent magnet within which the reduced end of the electromagnet-core is firmly secured, a locking and releasing device, an armature, means secured to said armature for coöperating with said locking and releasing device, and means carried by the armature for operating the trip or lock for releasing or locking the box mechanism, substantially as shown and described.

4. In an electric signal box or device, the combination with an electromagnet and an armature, said armature being provided with means for operating a trip or lock for releasing or locking the box mechanism, of a weighted locking-lever provided with a locking and releasing arm depending therefrom and operating in connection with means also secured to the armature to push and lock the armature away from the electromagnets when the signal is ended or complete, substantially as and for the purpose shown and described.

5. In an electric signal box or device provided with an electromagnetic controlling device substantially as set forth the combination with an armature operated by said electromagnet to lock or release the signal mechanism, of a locking-lever provided with an arm for cutting out the electromagnets from the circuit when the said armature is attracted to the electromagnets and locking the said armature to the electromagnets at the same time, substantially as and for the purpose shown and described.

6. In an electrical signal device embodying in its construction electromagnets for controlling the locking or releasing of the signal mechanism, the combination with the locking or releasing mechanism operated by the armature of said electromagnets, of an armature, a locking lever or device provided with downwardly-extended arms, one of said arms being adapted to lock the armature and the other for releasing or forcing the armature away from the magnets, said locking-lever being controlled in its action by a pivoted lever which is in turn operated by the signal mechanism, substantially as and for the purpose shown and described.

7. An electrical signal device or box comprising, in its construction, a signaling mechanism composed of suitable clockwork and make-and-break devices operated thereby, and means, such as a key or lever for setting or manipulating the same, electromagnets substantially such as described, a weighted vibratory locking-lever, an armature for releasing or locking the said mechanism by controlling the escapement according to the direction of the current passing through the main line of the circuit, and means carried by the locking-lever for cutting out the electromagnets when the armature is attracted to the magnets, substantially as shown and described.

8. In an electric signal device or box, the locking-lever comprising in its construction an arm for locking the armature of the controlling-electromagnets away from said magnets, an arm for locking the said armature to said electromagnets, and a cut-out arm for cutting out the electromagnets from the main circuit while the signal is being sent, all operating substantially as and for the purpose shown and described.

9. An electric signal device, comprising a mechanical movement-releasing device consisting of a lever engaging the movement when in its normal position, the said lever being pivoted to and carried by another pivoted lever whereby the movement-engaging lever is released to send in special signals, by the operation of the lever to which the said movement-lever is pivoted, substantially as described.

10. In an electric signal device, the combination with the pivoted movement-controlling lever, of a contact-spring secured to and operated by said lever whereby the box is cut out from the main circuit, and a pivoted lever adapted to carry and support said movement-controlling lever, substantially as shown and described.

In testimony whereof we sign this specification, in the presence of two witnesses, this 6th day of June, 1896.

ALBERT T. WHITTLESEY.
FREDERICK B. DODGE.

Witnesses:
W. E. DONNELLY,
ELLA E. TILDEN.